Dec. 4, 1945.　　　R. R. SNYDER　　　2,390,133
TURBINE CONSTRUCTION
Filed July 29, 1940　　　3 Sheets-Sheet 1

INVENTOR
Raymond R. Snyder
BY
Nathaniel Frank
ATTORNEY

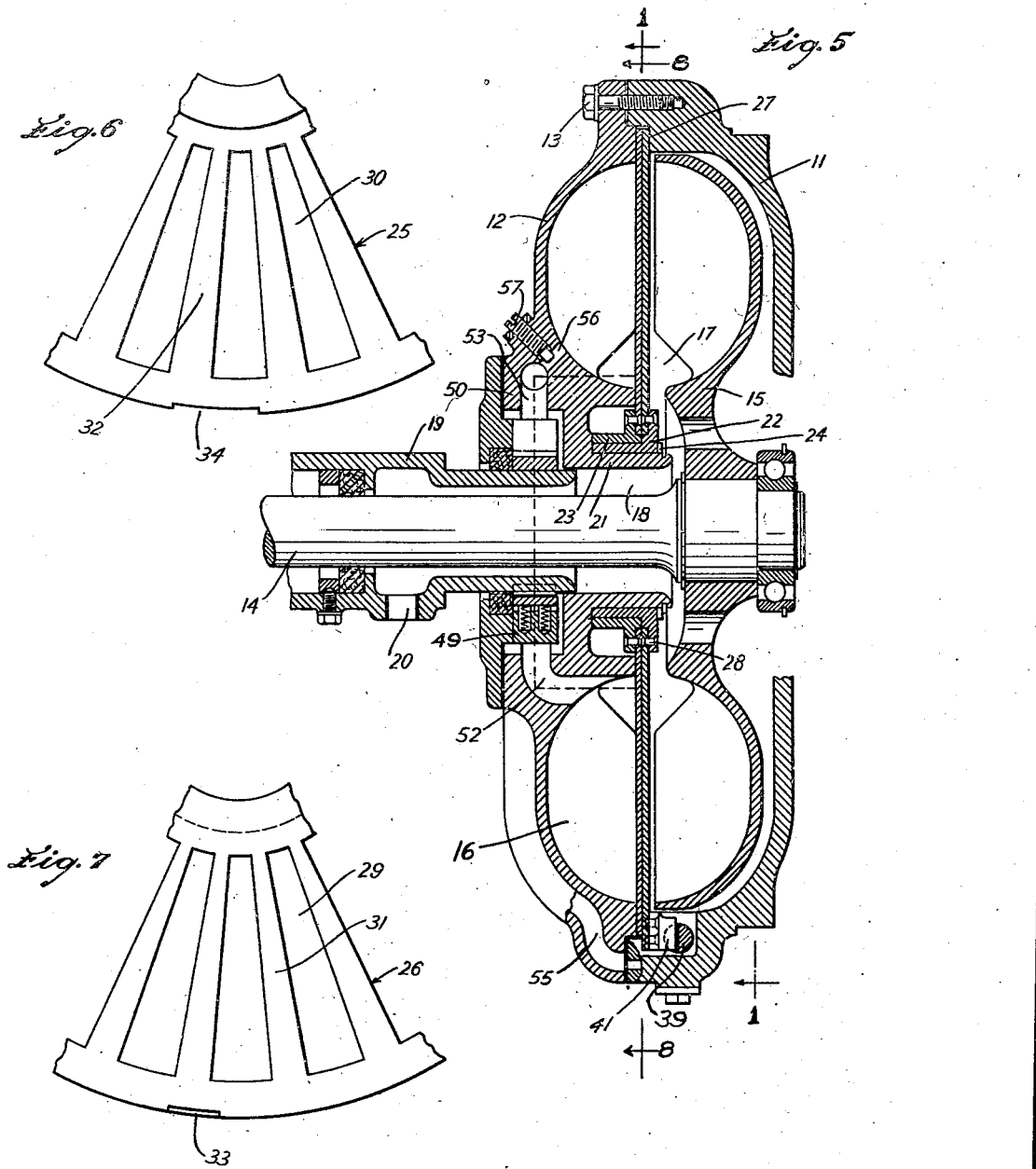

Patented Dec. 4, 1945

2,390,133

UNITED STATES PATENT OFFICE 2,390,133

TURBINE CONSTRUCTION

Raymond R. Snyder, Toledo, Ohio, assignor to Automatic Turbine Drive Company, Inc., a corporation of New York Application July 29, 1940, Serial No. 348,151

3 Claims. (Cl. 60—54)

My present invention relates to the turbine art, and has particular reference to the construction and operation of hydraulic couplings for use with automotive transmissions.

It is the principal object of my invention to provide a hydraulic coupling having a novel arrangement of parts for positively insuring adequate slip at low speeds.

It is an additional object of my invention to provide an improved apparatus for controlling slip in a hydraulic coupling, which automatically operates in accordance with the speed of rotation of the coupling.

It is a further object of my invention to provide an inexpensive slip control mechanism which is adapted for use with any type of hydraulic coupling, to either automatically or manually regulate the slip at any speed.

With the above and other objects and advantageous features in view, my invention consists of a novel method of control and a novel arrangement of parts more fully described in the detailed description following, in conjunction with the accompanying drawings, and more specifically defined in the claims appended hereto.

In the drawings:

Fig. 5 is a vertical section, parts being broken away, on the line 5—5 of Fig. 1;

Fig. 6 is a fragmentary detail of the lower control disk;

Fig. 7 is a fragmentary detail of the upper control disk; and

The use of hydraulic couplings for power transmissions, and particularly for automotive vehicles, has made it advisable to provide means for controlling the slip between the coupling rotors to obtain a maximum slip at low idling speeds, and to provide maximum efficiency of power transmission at operating speeds. I have found it feasible to control the amount of slip by interposing a suitable arrangement between the driving and the driven rotors of a hydraulic coupling, which is preferably automatically operated in response to changes of speed of rotation of the coupling, and which cuts off or otherwise controls the power transmission at low speeds. To this end, I provide a multiple disk valve, which is interposed between the driving and the driven rotors in the path of the hydraulic fluid, and is movable to cut off the passage of hydraulic fluid at low engine speeds, the parts being arranged so as to freely permit the power transmission of the hydraulic fluid at operating speeds.

Figure 1:
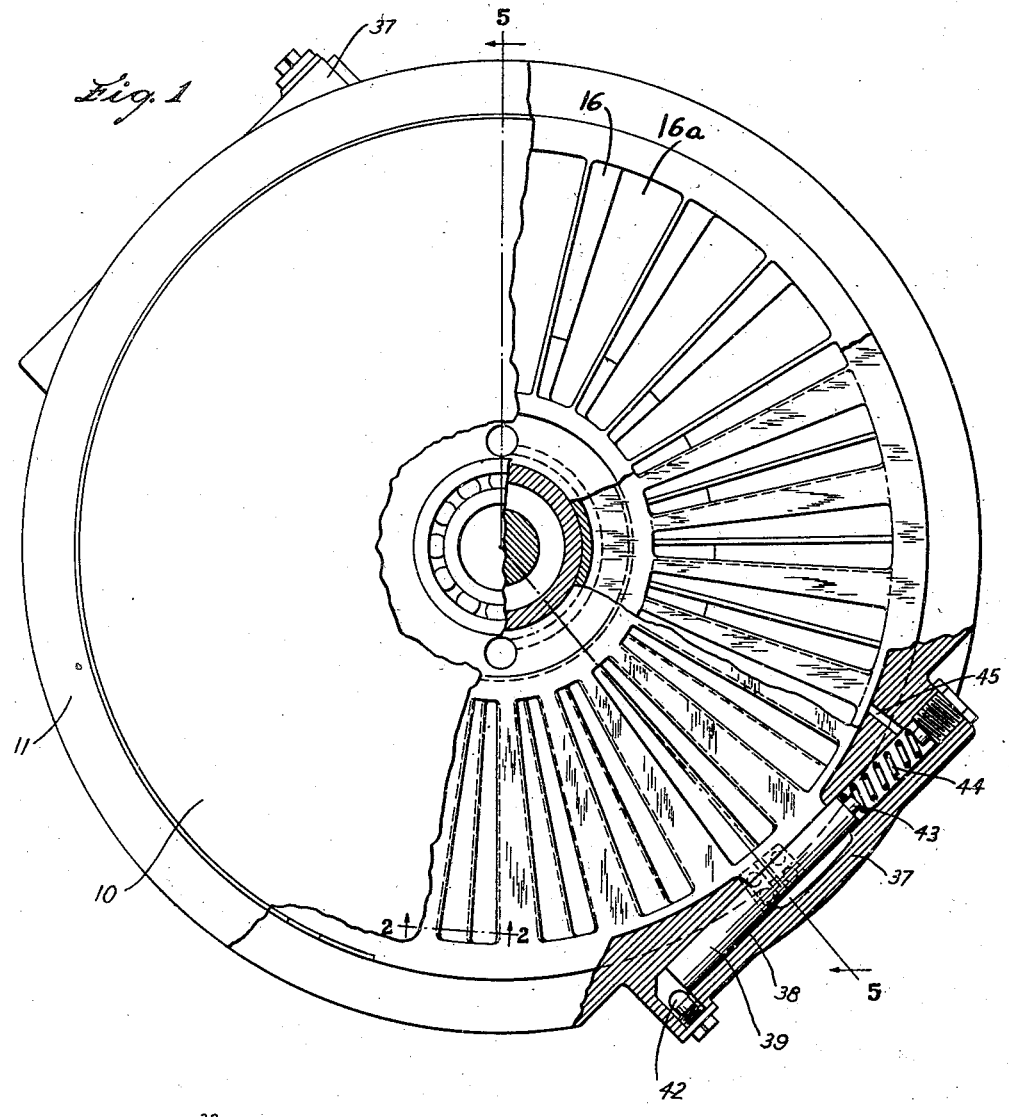
Fig. 1 is an elevation of the novel fluid hydraulic coupling, the outer cover being broken away to show the interior arrangement of parts.

Referring to the drawings, the hydraulic coupling, 10 in Fig. 1, which may be of any standard type of construction, has a fly wheel portion 11 which is secured to a driving rotor 12, as by means of peripheral bolts 13, the driving rotor 12 being spaced from the driven shaft 14 to which the driven rotor 15 is keyed. The driving and driven rotors are each provided with a plurality of radial vanes 16 which form buckets 16a, and are spaced apart as illustrated in Fig. 5, an inlet 17 for hydraulic fluid being provided adjacent the hub and communicating with a fluid passageway 18, formed between the driven shaft and an outer concentric housing 19; the housing has a passageway 20 which communicates with a fluid tank or reservoir maintaining hydraulic fluid under predetermined pressure, not shown, whereby the coupling is maintained full of fluid.

The driving rotor, see Fig. 5, is provided with a central flange portion 21, on which two cylindrical hubs 22 and 23 are mounted for rotation, suitable keys 24 being provided to prevent axial movement of the hubs; each hub carries a valve disk, respectively designated 25 and 26, see Figs. 6 and 7, the valve disks extending across the face of the driving rotor 12 and having their peripheries housed in a recess 27 in the fly wheel 11. The two disks are preferably made of thin stamped or cast material which has been machined, and are secured to their hubs by a plurality of spaced rivets 28. The disks have a plurality of corresponding radial slots 29, 30, formed by radial bars 31, 32, and the disk 26 has a plurality of fingers 33 extending laterally, the fingers 33 being seated in peripheral grooves 34 of greater length provided in the disk 25, to thus obtain a corresponding, but delayed movement of the disk 25 as the disk 26 is turned as hereinafter described.

Figure 2:
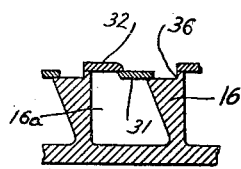
Fig. 2 is a section on the line 2—2 of Fig. 1.
Figure 3:
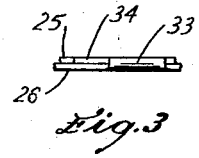
Fig. 3 is a detailed end view showing the engaging lock means for the slip control disks.

As shown in Fig. 2, the vanes 16 of the buckets 16a of the driving rotor are stepped as indicated at 36 to provide seats for the radial bars 31 and 32 between the slots 29 and 30 of the two disks.

Figure 4:
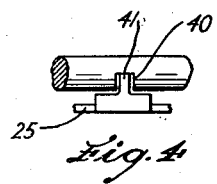
Fig. 4 is a detail, partly in section, showing the interlocking parts of the control piston and the disks.

Referring now to Figs. 1 and 4, two housings 37 are provided at diametrically opposite points of the fly wheel 11, the housings having elongated piston chambers 38 in which cylindrical pistons 39 are mounted for reciprocating movement, each piston having a recess 40 to receive an upstanding tooth 41 secured to or formed from the stock of the disk 25, whereby movement of the piston 39 produces a turning or a rotation of the disk 25. The recess 40 is sufficiently large to compensate for the angularity of the turning movement produced by reciprocation of the piston. The piston 39 is preferably actuated by fluid pressure, the fluid entering through an inlet 42 at one end of the housing to exert hydraulic pressure on the corresponding piston end, the piston having a reduced portion 43 at the other end to serve as a seat for a compression spring 44; a relief port 45 is provided at the spring end, communicating with the hydraulic coupling interior.

Figure 8:
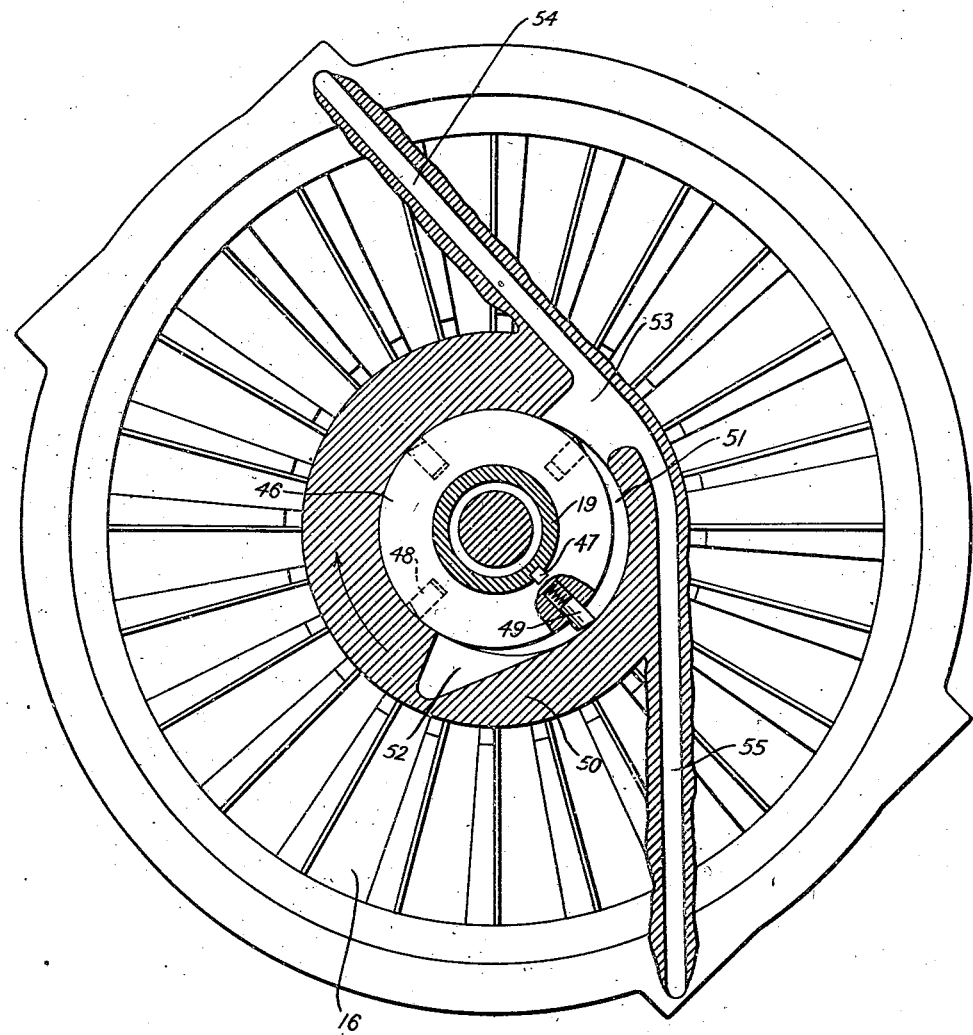
Fig. 8 is a view on the irregular line 8—8 of Fig. 5, showing the pressure pump and pressure fluid communicating ducts.

A preferred means for obtaining hydraulic pressure for actuating the piston 39 is illustrated in Fig. 8, and includes a pump arrangement 46 which is keyed to the stationary housing 19 as indicated at 47, the pump having a plurality of radial slots 48 in which spring pressed pistons 49 reciprocate. The hub portion 50 of the driving member 12 has a cam recess 51 engaging the pistons, whereby rotation of the driving rotor produces sliding movement of the pistons 49, and thus pumps fluid, as the inflow end of the cam recess communicates with a fluid inlet passageway 52, and the outflow end communicates with an outflow passage 53 which has two branches 54 and 55 leading to the inlet openings 42 of the housings 37.

Referring now to Fig. 5, the outflow passage 53 has a relief passageway or port 56 communicating directly with the interior of the coupling, this relief port being of relatively small size in comparison with the flow passages 54 and 55, means being further provided, such as a manually adjustable bolt 57 for additionally adjusting the size of the by-pass opening 56, whereby slow rotation of the driving rotor does not actuate the control pistons.

The operation of the control may now be explained. When the impeller is rotating at low speeds, the action of the pump is not sufficient, because of the relief bypass, to create a pressure greater than the pressure of the springs 44, whereby the pistons 39 remain in the position indicated in Fig. 1, and the two disk valves 25 and 26 remain in the position indicated in Fig. 2, thus closing the buckets of the driving rotor and preventing flow of hydraulic fluid from the driving rotor to the driven rotor. Full slip is thus obtained between the driving and driven rotors, and there can be no creeping or other movement of the driven rotor, whereby easy gear shifting can be obtained with any standard type of gear shifting mechanism. When the speed of the driving rotor is increased, the pump 46 begins to build up an excess pressure greater than can be dissipated by the bypass 56, and thus produces movement of the pistons 39 to swing the upper disk (as seen in Fig. 2) and partially uncover the buckets 16; the finger 30 now contacts the end of the groove 34 and further swing of the disk 25 then brings a swinging movement of the disk 26, whereby both disks finally seat in position to completely open the buckets 16a and to provide free clearance for the hydraulic fluid, whereby maximum power transmission is obtained.

The amount of slip may be readily controlled by changing the strength of the spring 44, or by regulating the size of the passage through the bypass 56; if desired, a pressure relief valve may be inserted in the bypass, or may be mounted in the pump, to be controlled hydraulically; the valve may for certain types of automobiles be connected with the shift lever or the clutch pedal, so as to be under the direct manual control of an operator.

While I have described a specific control employed for my invention, it is obvious that changes in the arrangement of the parts, in the size and the mounting of the parts, and in their operation, may be made to suit the requirements for different hydraulic coupling designs, without departing from the spirit and scope of the invention as defined in the appended claims.

I claim:

1. In a hydraulic coupling, a driving rotor, a driven rotor, said rotors having opposed buckets, said driving rotor having an axial hub associated therewith, a disk valve mounted on said hub and rotatable to cut off fluid flow to and from the buckets of the driving rotor, and means responsive to fluid pressure changes produced by change of speed of the driving rotor for rotating the valve.

2. In a hydraulic coupling, a driving rotor, a driven rotor, said rotors having opposed buckets, said driving rotor having an axial hub associated therewith, a disk valve mounted on said hub and rotatable to cut off fluid flow to and from the buckets of the driving rotor, fluid pressure means for rotating said valve, and pump means positioned in said coupling and operated by the driving rotor to provide variable fluid pressure in correspondence with the speed of the driving rotor, for actuating said fluid pressure means.

3. In a hydraulic coupling, a driving rotor, a driven rotor, said rotors having opposed buckets, said driving rotor having an axial hub associated therewith, a disk valve mounted on said hub and rotatable to cut off fluid flow to and from the buckets of the driving rotor, fluid pressure means for rotating said valve, and pump means including slidable vanes mounted in said driving rotor and engaging said hub for providing variable fluid pressure in correspondence with the speed of the driving rotor, for actuating said fluid pressure means.

RAYMOND R. SNYDER.